(12) United States Patent
Orlando et al.

(10) Patent No.: US 8,290,147 B2
(45) Date of Patent: Oct. 16, 2012

(54) SYSTEMS AND METHODS FOR EFFICIENTLY CREATING DIGESTS OF DIGITAL DATA

(75) Inventors: Gerardo Orlando, Newton, MA (US);
David King, Shrewsbury, MA (US);
Mark Krumpoch, Shrewsbury, MA (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 355 days.

(21) Appl. No.: 12/609,888

(22) Filed: Oct. 30, 2009

(65) Prior Publication Data

US 2011/0103578 A1 May 5, 2011

(51) Int. Cl.
*H04L 9/28* (2006.01)
(52) U.S. Cl. .......................................... 380/28; 708/492
(58) Field of Classification Search .................... 380/28;
708/492; 707/698–699
See application file for complete search history.

(56) References Cited

U.S. PATENT DOCUMENTS

| | | | |
|---|---|---|---|
| 6,779,011 B2 * | 8/2004 | Weng et al. ................... | 708/492 |
| 7,133,889 B2 * | 11/2006 | Parthasarathy et al. ....... | 708/492 |
| 7,895,253 B2 * | 2/2011 | Stein et al. .................... | 708/492 |
| 8,036,377 B1 * | 10/2011 | Poo et al. ........................ | 380/28 |
| 2005/0058285 A1 * | 3/2005 | Stein et al. ...................... | 380/29 |
| 2008/0279368 A1 * | 11/2008 | Yen ................................. | 380/28 |
| 2009/0008064 A1 | 1/2009 | Nicole et al. | |
| 2009/0080616 A1 * | 3/2009 | Yoshii et al. .................. | 378/133 |

OTHER PUBLICATIONS

Huo et al. "The Design and FPGA Implementation of GF(2A128) Multiplier for Ghash" [Online], Apr. 25-26, 2009 [Retrieved on: Apr. 26, 2012], IEEE [www.ieee.org], 2009 International Conference on Networks Security, Wireless Communications and Trusted Computing, pp. 554-557 [continued in next entry].*
[Retrieved from: http://ieeexplore.ieee.org/stamp/stamp.jsp?tp=&arnumber=4908327].*
Orlando, G. "Efficient Elliptic Curve Processor Architectures for Field Programmable Logic," Ph.D. Thesis Presented Mar. 4, 2002 Worcester Polytechnic Institute, Worcester, MA, Chapter 4.9, 4.91, 4.92. pp. 125-133.
Orlando, G. "Efficient Elliptic Curve Processor Architectures for Field Programmable Logic," Ph.D. Thesis Presented Mar. 4, 2002 Worcester Polytechnic Institute, Worcester, MA, Chapter 4.10. pp. 134-138.
Ferguson, N. "Authentication Weaknesses in GCM," Comments to the NIST Modes of Operation Process. 2005.
Satoh, A. "High-Speed Parallel Hardware Architecture for Galois Counter Mode," IEEE International Symposium on Circuits and Systems, May 2007, pp. 1863-1866.
Hori, Yohei, et al. "Bitstream Encryption and Authentication with AES-GCM in Dynamically Reconfigurable Systems," IEEE International Conference on Field Programmable Logic and Applications. Sep. 2008. pp. 23-28.

(Continued)

*Primary Examiner* — Philip Chea
*Assistant Examiner* — Eric W Shepperd
(74) *Attorney, Agent, or Firm* — Ingrassia Fisher & Lorenz, P.C.

(57) ABSTRACT

Systems and methods efficiently process digests, hashes or other results by performing multiplicative functions in parallel with each other. In various embodiments, successive processing stages are provided, with each stage performing parallel multiplicative functions and also combining input terms to reduce the total number of terms that remain to be processed. By progressively combining the active terms into a smaller number of terms for subsequent processing, the time needed to process a result can be significantly reduced.

19 Claims, 4 Drawing Sheets

OTHER PUBLICATIONS

Satoh, A., et al. "High-Speed Hardware Architectures for Authenticated Encryption Mode GCM," IEEE International Syposium on Circuits and Systems, Sep. 2006. pp. 4831-4834.

Dworkin, M. "Recommendation for Block Cipher Modes of Operation: Galois/Counter Mode (GCM) and GMAC," National Institute of Standards and Technology. Gaithersburg, MD, Nov. 2007, NIST Special Publication 800-38D.

* cited by examiner

SYSTEMS AND METHODS FOR EFFICIENTLY CREATING DIGESTS OF DIGITAL DATA

TECHNICAL FIELD

The present disclosure generally relates to data processing, and some implementations relate to techniques and systems for efficiently creating digests of digital data, such as multiplicative hashes, cyclic redundancy checks, GHASH tags commonly associated with Galois Counter Mode (GCM) cryptographic operations, and/or the like.

BACKGROUND

Traditional cryptography refers to the practice of obscuring information to prevent unauthorized access. Modern cryptography generally makes use of mathematical ciphers and other techniques to ensure that only authorized users are able to access encrypted data. Cryptographic techniques have also been used to verify the identities of people, software or other entities. So-called "digital signatures", for example, commonly use cryptographic techniques to verify that a person or entity "signing" an electronic message is in fact the party that it claims to be. Cryptography is commonly used in electronic commerce, both for identifying parties to transactions and for ensuring that confidential data (e.g., credit card numbers) are not exposed to unauthorized parties. Cryptography is also widely used in many other commercial, military and personal settings to authenticate parties to electronic communications and/or to preserve the confidentiality of communications.

In recent years, cryptographic techniques have become more and more advanced, both in terms of the mathematics involved and the computing resources used to process such algorithms. The Galois Counter Mode (GCM) technique, for example, is one example of a block cipher system that provides both confidentiality and data origin authentication. Typically, the authenticated encryption operation of GCM receives four inputs corresponding to a secret key, an initialization vector (IV), a plaintext, and additional authenticated data (AAD). The GCM system conventionally provides two outputs: a ciphertext message that corresponds to the encrypted plaintext, as well as an authentication tag that can be used to verify the identity of the sender and/or to ensure that the integrity of the decrypted ciphertext. The authentication tag is conventionally computed according to a well-known digest technique known as "GHASH", which is generally considered to be relatively computationally demanding. As a result, the data processing resources used to compute conventional GHASH digests in the time frames generally requested for electronic communications can be significant; these computational demands are often met with hardware that can be relatively expensive and/or that can consume an undesirable amount of power. Many other types of block cipher systems and other cryptographic techniques other than GCM are similarly deployed in many different computing environments, and many of these techniques can similarly demand significant processing resources to provide computed results in the requested timeframes.

As a result, it is desirable to create systems and techniques for efficiently creating digests of block cipher or other digital data. Other desirable features and characteristics will become apparent from the subsequent detailed description and the appended claims, taken in conjunction with the accompanying drawings and this background of the invention.

BRIEF SUMMARY

According to various embodiments, systems and methods efficiently process digests, hashes or other results for use in cryptography and/or other applications as desired. Generally speaking, processing of more than one multiplicative function can be performed more-or-less simultaneously, thereby streamlining the processing of multiplication-heavy algorithms. In various embodiments, successive processing stages are provided, with each stage performing parallel multiplicative functions and also combining input terms to reduce the total number of terms that remain to be processed. By progressively combining the active terms into a smaller number of terms for subsequent processing, the time needed to process a digest, hash, CRC code or similar function can be significantly reduced.

In some embodiments, a method executable by digital processing logic computes a digest that represents a set of input values processed with common value, wherein the input values are initially treated as a set of active values and the common value is initially treated as a multiplier value. This exemplary method comprises processing each of a plurality of pairs of first and second ones of the active values, wherein the processing comprises multiplying the first ones of the active values by the multiplier value and combining the products with second ones of the active values, performing additional processing using the plurality of processed pairs as the subsequent set of active values and using a square of the prior multiplier value as a subsequent multiplier value, and providing the digest as a function of the processed pairs.

Other embodiments suitably provide a system to process a digest of a set of input values processed with a common value. This exemplary system comprises a first processing stage and at least one subsequent processing stage. The first processing stage is appropriately configured to receive the set of input values and to create a plurality of first paired values from the set of input values, each of the paired values representing a first one of the set of terms that is multiplied by the common value and combined with a second one of the set of terms. The subsequent processing stage is configured to receive the paired values from the prior processing stage and to create at least one second paired value from the received paired values, each of the at least one second paired values representing a first one of the first paired values that is multiplied by a square of the common value and that is combined with a second one of the first paired values. In some implementations, the various processing stages may be implemented in hardware using a field programmable gate array (FPGA) or other configurable gate array (CGA) device.

Still other embodiments provide a method executable by digital processing logic to compute a GHASH digest of a set of cryptographic values processed with hash subkey, wherein the cryptographic values are initially treated as a set of active values and the hash subkey is initially treated as a multiplier value. This exemplary method comprises processing each of a plurality of pairs of first and second ones of the active values in parallel, wherein the parallel processing comprises multiplying the first ones of the active values by the multiplier value and combining the products with second ones of the active values, wherein the plurality of processed pairs represents the set of active values using fewer terms than the set of active values. Further parallel processing is subsequently performed for any number of subsequent stages using the plurality of processed pairs as the subsequent set of active values and using a square of the prior multiplier value as a subsequent multiplier value until a single resulting pair remains. The GHASH digest is then provided as a function of the single processed pair. Various further embodiments may combine serial and parallel processing of the set of cryptographic values, as desired.

Other embodiments may variously include software program products, digital storage media and/or other apparatus incorporating structures and/or techniques described herein. Additional detail about various embodiments is set forth below.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely example in nature and is not intended to limit the invention or the application and uses of the invention. Furthermore, there is no intention to be bound by any theory presented in the preceding background of the invention or the following detailed description of the invention.

According to various exemplary embodiments, systems and processes are provided that efficiently process data using parallel multiplicative functions that can be performed more-or-less simultaneously, thereby streamlining the processing of multiplication-heavy algorithms. In various embodiments, successive processing stages are provided, with each stage performing parallel multiplicative functions and also combining input terms to reduce the total number of terms that remain to be processed. By progressively combining the active terms in to a smaller number of terms for subsequent processing, the time needed to process a digest, hash, CRC code or similar function can be significantly reduced. Further, the parallel multiplication feature can produce significant reductions in overall processing times in some embodiments. Some embodiments could implement the techniques and systems described herein using field programmable gate arrays (FPGAs) or other configurable gate array (CGA) devices, thereby allowing for convenient and relatively low-cost hardware implementation that is capable of high-speed processing in any number of demanding environments and applications.

The general structures and functions described herein are frequently described in conjunction with cryptographic functions such as the Galois Counter Mode (GCM). GCM and similar block cipher functions are simply examples of implementations that may make use of the concepts described herein. Equivalent embodiments may use similar structures and functions to process any number of other data types in addition to or in place of the cryptographic functions described herein. For example, equivalent techniques could be used in any sort of multiplicative hashing, in the computation of cyclic redundancy check (CRC) codes, and/or in any other applications as desired.

Figure 1:
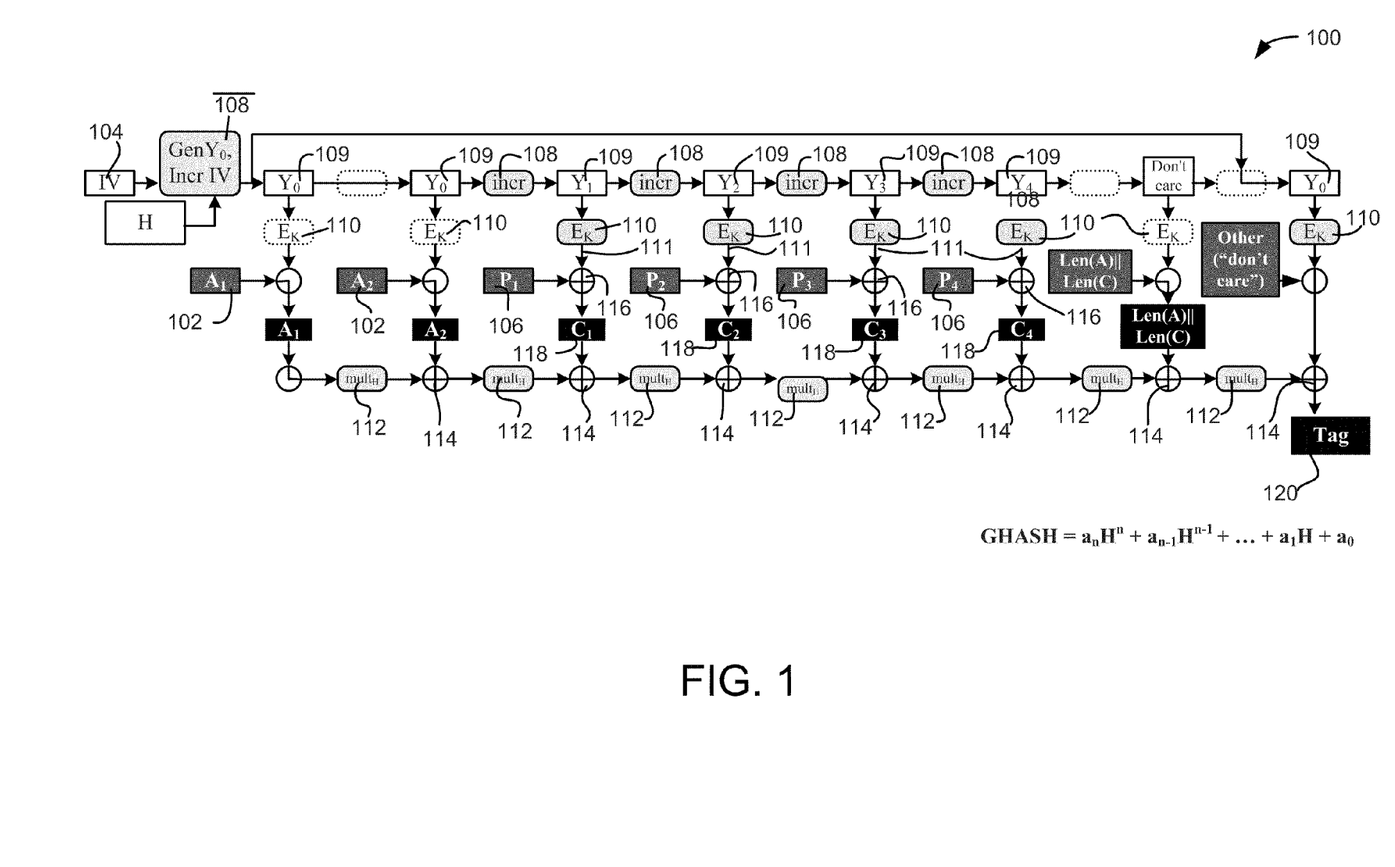
FIG. 1 is a diagram of a conventional Galois Counter Mode system.

With reference now to FIG. 1, an exemplary system 100 that is shown based upon the Galois Counter Mode system suitably encrypts plaintext 106 of any appropriate size or format to create ciphertext 118 using conventional techniques and processes. As shown in FIG. 1, system 100 typically begins with an initial value (IV) 104 that is incremented 108 any number of times to create a series of counter values 109 that are sequentially applied to a cryptographic function 110. Function no, in turn, manipulates the received values 109 according to any appropriate block cipher or other algorithm to generate a stream of pseudorandom key values 111. These key values 111, in turn, may be combined with the plaintext 106 of the message to create encrypted ciphertext 118. Key values 111 may be combined with the plaintext 106 in any suitable manner; in various embodiments (and as illustrated in FIG. 1), the combination 116 is simply a bit-wise XOR function, although other embodiments may perform any other bitwise or other logical functions on the plaintext 106, as desired.

In addition to creating the encrypted ciphertext, conventional GCM systems 100 provide authentication of the data sender using a GHASH or similar algorithm. The GHASH algorithm conventionally begins with "additional authenticated data" (AAD) 102 based upon a digital signature or other information unique to the data sender. That initial data 102 is suitably multiplied by a hash subkey "H" 112 before being XOR'ed or otherwise combined 114 with a portion of the ciphertext 118. The value resulting from combination 114 is then supplied to a subsequent multiplier 112, where it is again multiplied by the hash subkey "H". The serialized cycles of repeatedly multiplying a feedback value by the hash subkey and then combining the resulting product with additional ciphertext 118 continues until all of the ciphertext 118 has been processed. The result of the final combination of terms can then be further processed (e.g., using the GCM processing features shown in FIG. 1) and/or provided as an output "tag" that represents all of the ciphertext data with a shortened digest 120.

Digest 120 is any hash value or other abstraction that represents the input data (e.g., ciphertext 118) in a shortened form. Typically, digest 120 is output from a deterministic procedure that uses bitwise (e.g., XOR) or other functions so that the output digest will change if any portion of the input data changes. In the GHASH example, the output tag digest 120 may be the approximately the same length as a single block of ciphertext 118, but the contents of the tag block 120 will be set or cleared based upon the entire set of the ciphertext 118. That is, even minor changes in any portion of the ciphertext bitstream will be reflected in the shortened digest 120. In particular, the GHASH tag will typically represent a set of input values $a_0$-$a_n$ as a polynomial function of the hash subkey "H" as follows:

$$GHASH = a_n H^n + a_{n-1} H^{n-1} + \ldots + a_1 H + a_o \qquad (1)$$

where "+" represents the bitwise XOR function and where multiplication and exponentiation is performed in accordance with conventional constructs (e.g., the $GF(2^{128})$ Galois Field for GCM). Other embodiments may use other functions, algorithms and techniques other than GCM (with correspondingly different relationships than Equation 1), as desired. Examples of other digest-generating algorithms include MD4, MD5, SHA, RIPEMD and the like.

In many embodiments, the digest 120 is provided to a message recipient along with the generated ciphertext. The recipient typically uses the digest 120 to verify that the contents of the ciphertext have not changed during transit, and that the sender's credentials are acceptable. Generally, the recipient of the encrypted ciphertext 118 will repeat the GHASH (or other appropriate) technique on the received data to ensure that the GHASH computed on the received values matches that of the transmitted values, thereby ensuring the integrity of the received data. Both transmitters and receivers, then, typically execute the GHASH algorithm to compute a digests of cryptographic data.

The GHASH algorithm shown in FIG. 1, however, can be relatively slow to implement in practice due to the serialized multiplicative functions 112. Multiplicative functions are generally considered to be relatively slow and computationally intense, particularly in contrast to the much faster bit operations commonly performed by blocks 110 and 116 in converting plaintext 106 to ciphertext 118. Processing the serial chain of multiplications as shown in FIG. 1, then, can be relatively time consuming. As a result, relatively fast hardware (e.g., microprocessors, application specific integrated circuits (ASICs) and/or the like have been conventionally used in many communications settings to ensure adequate throughput.

Various embodiments therefore streamline the computation of GHASH or similar digests 120 by exploiting parallel multiplicative functions, in which multiple terms are simultaneously processed and in which the numerous input terms can be sequentially reduced to a single term (or a few terms that can readily be processed to result in an output digest value). Because the ciphertext 118 can generally be processed much faster than the digest tag 120, the various coefficients $a_0$-$a_n$ shown in Equation 1 above are typically available relatively quickly. Rather than serially chaining the multiplicative functions 112 of the various terms used to create tag 120, then, the various terms based upon ciphertext 118 may be processed at least partially in parallel. Note that "multiplication", in this context, may refer to processing in accordance with a GCM or other algorithm, which may incorporate multiplicative or other processing that differs from or otherwise augments classical multiplication. That is, the actual "multiplicative function" that is performed in some embodiments may involve multiplicative hashing or any other sort of processing other than or in addition to conventional multiplication of numeric values.

Figure 2:
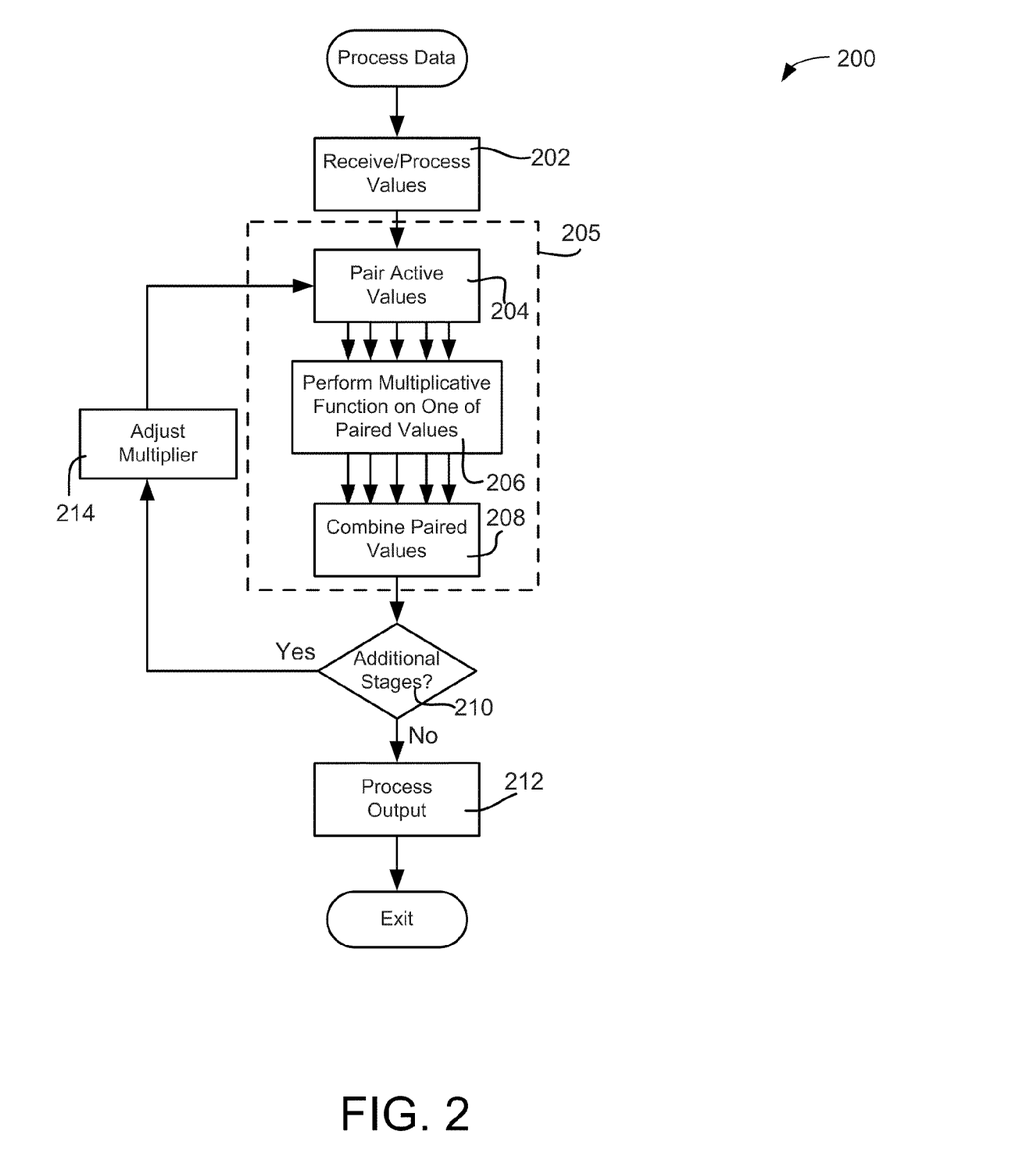
FIG. 2 is a flowchart of an exemplary technique for computing digests of a set of input values.

FIG. 2, for example, shows one process for efficiently processing data to create a digest or similar output. As shown in FIG. 2, an exemplary process 200 suitably includes the broad functions of receiving any number of values to process (function 202) and executing one or more processing stages 205 in which the various values are processed at least partially in parallel. The parallel processing 205 generally includes pairing or otherwise arranging the active values as desired to facilitate combining of multiple terms (function 204), multiplying one of the paired terms by an appropriate multiplier value (function 206), and combining the product of the multiplication with the other paired value (function 208) to reduce the number of active values that will be processed in the next processing stage 205. At the end of each processing stage (function 210), the multiplier value is appropriately adjusted for use in the subsequent stage 205. After all of the processing stages 205 are complete, the resulting digest or other result can be further processed and/or otherwise output (function 212) as desired.

The particular values processed by process 200 may be received in any format (function 202). In various embodiments, the values received correspond to the $a_o$-$a_n$ values in Equation 1 above or to the ciphertext 118 as shown in FIG. 1, although other embodiments may receive other values as appropriate. Some implementations may further scale, filter, combine and/or otherwise pre-process the received values in any manner to place the received data into an appropriate format for processing within process 200.

Any number of processing stages 205 may be provided. Generally speaking, the number of processing stages 205 may depend upon the number of input terms and the format of the desired output. In embodiments that seek to pair values of the active data as described below, the output of each processing stage 205 will produce an output with half as many terms as the input. A two stage implementation may therefore reduce four terms to a single term (e.g., 4:2 in the first stage, 2:1 in the second stage). A three stage embodiment could allow for eight terms to be reduced to one (with 8:4, 4:2 and 2:1 stages). An exemplary four-stage implementation could similarly reduce 16 terms to 8 in a first stage, 8 terms to 4 in a second stage, 4 terms to 2 in a third stage, and 2 terms to 1 term in a fourth stage. Sixteen terms could also be reduced to a single term by serially processing two different sets of eight terms in a three-stage embodiment, as described more fully below. Any number of stages could be provided in other embodiments to support reductions of any number of terms to any other number of terms.

Each stage 205 may involve forming pairs (or other groupings) of active terms (function 204), multiplying one of the paired values by an appropriate multiplier (function 206), and then combining the product of the multiplicative function with the other paired value. Grouping values in this manner allows for parallel processing of the multiplicative function 206 so that the overall time needed to execute process 200 is less than the time that would be needed to execute the multiplications in series. A stage 205 that processes eight terms, for example, could form four pairs of values and could process multiplicative functions of four terms in parallel, as described more fully below.

The multiplicative function 206 suitably includes multiplying one of the paired terms by an appropriate multiplier value or performing other multiplicative functions as desired. In various embodiments, the multiplier value corresponds to a power of the hash subkey (H) used in a GHASH algorithm; other embodiments may use other multipliers as appropriate. Generally speaking, the multipliers applied in the various stages 205 may be related to each other; in the GHASH algorithm, for example, successive stages may apply squared values of the prior stage, as described more fully below. As noted above, the multiplicative function may not be limited to the classical multiplication function, but may include alternate or additional features as well, including any multiplication-type features used in GCM or other algorithms.

After multiplying one of the values in each pair by the appropriate multiplier in the example of FIG. 2, the resulting product is combined with the other value in the pair as desired. In various embodiments, this combination is the result of a bitwise XOR or other binary function. Each processed pair, then, results in a single term ("A") that represents two input terms ("an" and "an,") according to the relationship:

$$A = a_n X + a_{n-1} \quad (2)$$

wherein "X" represents the multiplier value for that stage. In a GHASH implementation, "X" in Equation 2 may be simply the GCM hash subkey (H) in a first stage 205, with subsequent stages using appropriate powers of H as the multiplier value X, as described more fully below. Other embodiments could use other operands or multiplier values as desired.

The multiplier value "X" may be adjusted between stages 205 (function 214) as desired. For example, subsequent GHASH processing stages 205 may use squares of the prior multiplier. That is, a first stage could use the hash subkey H as the multiplier X in a first stage, the square of the hash subkey ($H^2$) as the multiplier X in a second stage, the fourth power ($H^4$) as the multiplier X in a third stage, and so on. Squaring functions can often be performed very efficiently in comparison to other multiplication functions, so arranging the processing to exploit multiplication by squared values may have further benefits in terms of reduced processing time, as described more fully below.

As noted above, various embodiments could have any number of processing stages depending upon the number of terms that are to be processed. FIG. 2 shows a comparison block 210 for consistent logic to show that different embodiments may use any number of processing stages 205. In practice, however, many embodiments will not perform a literal check to determine if processing should continue. To the contrary, many embodiments may be implemented in configurable gate arrays (CGAs) or the like that have been "hard wired" to implement a static number of processing stages 205. While some embodiments (e.g., primarily software embodiments) may use looping or iterative structures, it is possible that block 210 will not be literally present in many practical embodiments.

After the various processing stages 205 are complete, the resulting digest or other output may be processed as desired (function 212). The output may be provided as an argument returned from a programming function, routine or other procedure in some software implementations. Alternately, the output value may be latched or otherwise output from a hard-wired digital logic circuit (e.g., a CGA, ASIC or the like). Other embodiments may provide the output value in any format using any sort of hardware, software, firmware and/or other logic, as desired.

Generally speaking, each of the various steps in process 200 may be performed by any sort of computational hardware, firmware and/or software executing in any environment. In an exemplary embodiment, process 200 is implemented in software instructions that are associated with conventional processing that can be stored in memory or in any other mass storage, and that can be executed on any processor (e.g., any sort of conventional microprocessor, microcontroller, digital signal processor or the like, or any computing system based upon any sort of processor or controller). Other embodiments may be implemented in dedicated processing hardware, firmware and/or other means as desired, including any sort of common gate array, ASIC, or other programmed or programmable digital logic as desired. Some embodiments of the techniques and systems described in FIGS. 2-4, for example, may be very efficiently implemented using FPGA or other CGA structures, although other embodiments may use other types of hardware, firmware and/or software as desired.

Figure 3:
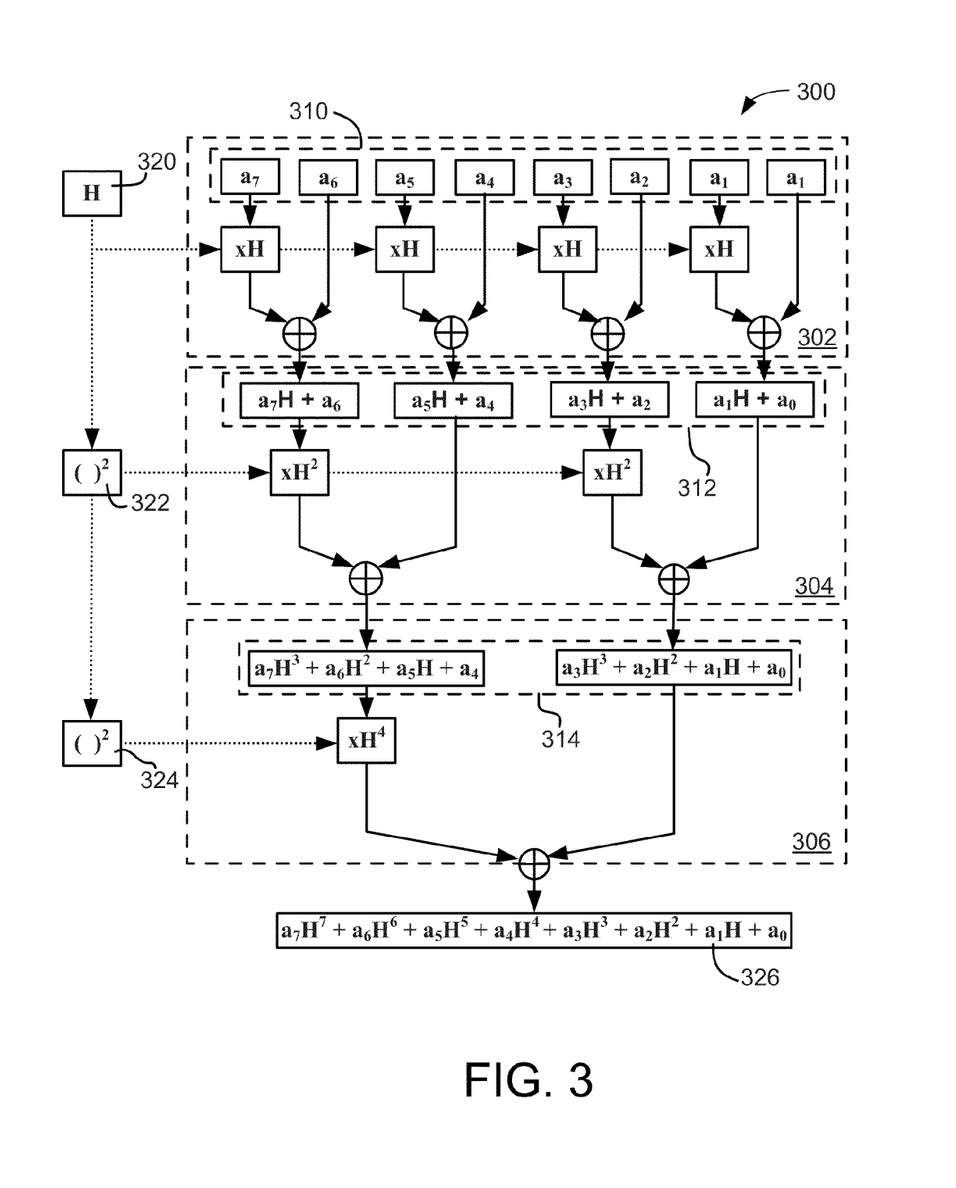
FIG. 3 is a block diagram showing one example of logic that could be used to implement an exemplary system or technique for processing a set of input values.

FIG. 3 shows an exemplary implementation of logic 300 that could be used to compute a digest or perform other data processing tasks. The particular example illustrated in FIG. 3 is an 8:1 GHASH processing scheme that reduces eight terms ($a_0$-$a_7$) to a single output term; the general concepts illustrated in FIG. 3, however, could be readily abstracted or supplemented to any number of other implementations, including other GHASH schemes that process different amounts or formats of input data. Although the logic 300 shown in FIG. 3 could be implemented in any manner, various embodiments could conveniently implement the various function blocks shown in FIG. 3 with a field programmable gate array (FPGA) or other CGA-type device. Such embodiments would typically be "hard wired" for a particular implementation, with data values (e.g., input values $a_0$-$a_7$ shown in FIG. 3, as well as hash subkey H) supplied by an external processor or processing system.

FIG. 3 shows logic 300 as including three processing stages 302, 304 and 306. Each of these stages 302, 304, 306 performs a term reduction process similar to that described above in conjunction with stages 205 in FIG. 2. That is, each stage 302, 304, 306 reduces the number of terms by a factor of two. Stage 302, for example, receives eight input terms 310 ($a_0$-$a_7$), performs four parallel multiplications and combinations, and then provides four terms 312 to stage 304. Stage 304, in turn, performs two parallel multiplications and combinations on the four terms 312 from stage 302, and then provides two resultant terms 314 to stage 306. Stage 306 performs a single multiplication in this example, with the result of the multiplication being very similar to Equation 1. That is, the result produced from logic 300 should equate to the result obtained from a conventional GHASH algorithm. In contrast to the seven serial multiplications that would be needed with the FIG. 1 technique, however, the FIG. 3 logic 300 shows three serial stages of multiplications (corresponding to each of the three stages 302, 304, 306), with stage 302 having four parallel multiplications and stage 304 having two parallel multiplications. While FIG. 3 shows seven total multiplications, the overall time to execute the complete process can be dramatically reduced by moving at least some of the multiplications to be performed in parallel rather than serially with each other. Hence, the multiple multiplications occurring at stages 302 and 304, for example, do not slow down the total process of logic 300 because they are performed in parallel. Note that as additional stages would be added, the time savings would become more substantial as an even greater number of parallel multiplications could take place with only one additional processing stage.

FIG. 3 also shows that the hash subkey 320 or other multiplier may be provided from a common source to multiple multiplication blocks in the various stages. This feature could further reduce the time needed to execute the overall process 300, since the multiplier value need only be determined once before being supplied to the other logic that uses the common value. In a GHASH implementation, for example, the hash subkey (H) need only be computed once to be used in various blocks within logic 300.

Even further, the hash subkey can be squared or otherwise processed between stages, as noted with respect to function 214 in FIG. 2. In the exemplary logic 300 of FIG. 3, the multiplier is squared at logic 322, and then the result can be squared again at logic 324 to generate values of H to the second and fourth powers, respectively. As noted above, squaring can typically be performed very efficiently using digital logic in a CGA device, ASIC and/or microprocessor or other control device. By designing logic 300 to exploit the use of squared values, then, processing times can be further reduced in comparison to schemes that would otherwise require computation of non-square powers of the multiplier value. Further, the squared (or other exponentiated) values may be supplied from a common computation source to multiple logic blocks having need of the value. The computed value of the square of H ($H^2$), for example, can be readily provided to both multiplication blocks in stage 304, thereby removing the need for each logic block to independently derive the appropriate value.

Using logic 300, then, the eight input terms 310 can be effectively processed through three stages 302, 304, 306 to arrive at a single output term 326. Once again, the general concepts shown in FIG. 3 may be supplemented, abstracted or otherwise modified in any number of equivalent embodiments, including embodiments that process fewer input terms, more input terms, or terms of different formats. Many other equivalent variations may be formulated.

Figure 4:
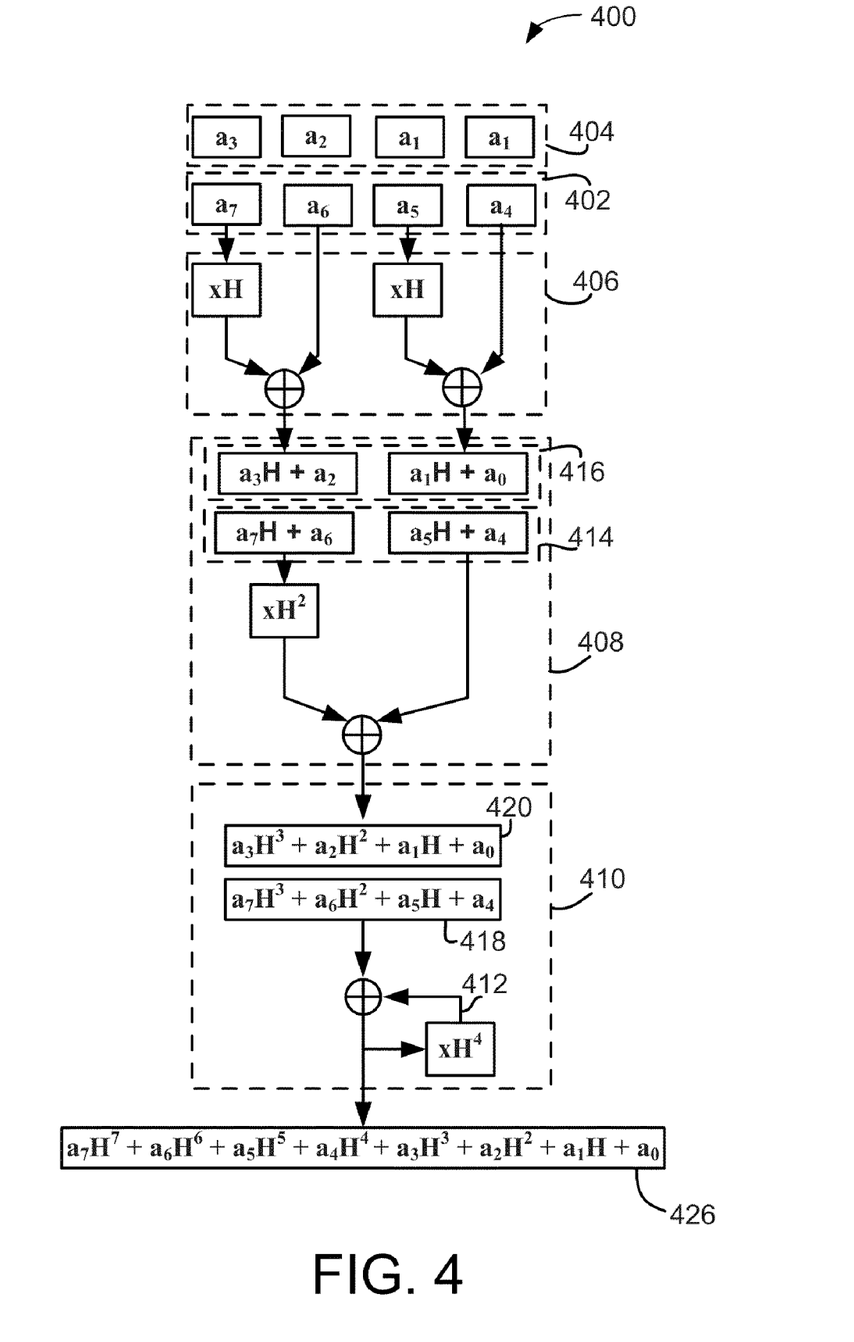
FIG. 4 is a block diagram showing another example of logic that could be used to implement an exemplary system or technique for processing a set of input values.

FIG. 4 shows an alternate embodiment of computational logic 400 that combines serial and parallel processing to compute a GHASH digest or other output. The example of FIG. 4 shows two processing stages 406 and 408 that perform multiplication and combination functions on two (or more) serially-provided data sets 402 and 404. An additional stage 410 provides post-processing of the resultant values 418, 420 to create an output digest 426 similar (if not identical) to output tag 326 in FIG. 3 and/or output tag 120 in FIG. 1. Although the logic 400 in FIG. 4 illustrates an example with four parallel processing channels, other embodiments may add or subtract processing stages and other features to support processing of any number of input and output terms.

In the example of FIG. 4, two sets of input values 402, 404 are sequentially applied to the first stage 406. Each of these sets 402, 404 is independently processed using the techniques described above to create two sets of output values 414, 416 (respectively). These values 414, 416 are then processed by stage 408 to create two resultant terms 418 and 420. These two terms may then be combined with each other using a conventional delay structure 412 as desired. As shown in FIG. 4, term 418 is multiplied by an appropriate multiplier value ($H^4$ in this case) and then combined with the subsequently-processed value 420 to arrive at result 426.

Combining serial and parallel processing can allow for improved flexibility, particularly in embodiments wherein logic 400 is partially or entirely implemented in CGAs or other hardware. If processing resources support only a limited number of parallel channels, for example, the additional data may nevertheless be combined into the output tag 426 using serial processing techniques that share the parallel channels between multiple sets of input values. Again, serial and parallel processing may be combined and/or used separately in any manner.

The general concepts set forth herein may be readily applied in any number of equivalent settings beyond GCM and other cryptographic techniques. The parallel processing techniques described above may be readily adapted and used to compute any sort of multiplicative hashes or cyclic redundancy check (CRC) codes, for example, or for any other purpose.

Various systems and techniques for processing data are therefore described. These techniques and systems may be variously applied in any military, commercial, personal or other setting for cryptographic or other purposes. Any number of modifications and enhancements could be formulated from the various examples described herein.

As used herein, the word "exemplary" means "serving as an example, instance, or illustration". "Exemplary" embodiments are not intended as models to be literally duplicated, but rather as examples that provide instances of embodiments that may be modified or altered in any way to create other equivalent embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A method executable by digital processing logic to compute a digest that represents a set of input values processed with common value, wherein the input values are initially treated as a set of active values and the common value is initially treated as a multiplier value, the method comprising:

processing each of a plurality of pairs of first and second ones of the active values, wherein the processing comprises multiplying each of the first ones of the active values by the multiplier value in parallel with each other and combining the products with second ones of the active values;

repeating the processing using the plurality of processed pairs as a subsequent set of active values and using a square of the prior multiplier value as a subsequent multiplier value, wherein the processing is repeated until a single active value remains; and providing the digest as a function of the processed pairs.

2. The method of claim 1 wherein the plurality of processed pairs represents the set of active values using fewer terms than the set of active values.

3. The method of claim 1 further comprising computing the square of the prior multiplier value with the digital processing logic.

4. The method of claim 1 further comprising receiving the square of the prior multiplier value from separate processing logic.

5. The method of claim 1 further comprising computing each of the set of input values according to a cryptographic function.

6. The method of claim 1 further comprising receiving the set of input values from separate processing logic.

7. The method of claim 1 further comprising serially applying a first set of input values and a second set of input values to the digital processing logic, wherein the processing comprises repeating the processing for the first set of input values until only a first single active value remains and then repeating the processing for the second set of input values until only a second single active value remains, and further comprising computing the digest as a function of the first and the second single active values.

8. The method of claim 7 wherein the computing the digest comprises multiplying one of the first and second single active values by a square of the prior multiplier value.

9. The method of claim 1 wherein the digest is a cyclic reduction check (CRC) code.

10. The method of claim 1 wherein the digest is a Galois Counter Mode (GCM) GHASH digest.

11. A system to process a digest of a set of input values processed with a common value, the system comprising:

a first processing stage configured to receive the set of input values and to create a plurality of first paired values from the set of input values, each of the first paired values representing a first one of the set of input values that is multiplied by the common value and combined with a second one of the set of input values; and at least one subsequent processing stage configured to receive the plurality of first paired values from the first processing stage and to create one or more second paired values from the received plurality of first paired values, each of the one or more second paired values representing a first one of the plurality of first paired values multiplied by a square of the common value and that is combined with a second one of the plurality of first paired values;

wherein the first processing stage and the at least one subsequent processing stage comprise parallel processing logic to create each paired value in parallel, and wherein the at least one subsequent processing stage is configured to continue processing until a single resulting pair remains.

12. The system of claim 11 wherein the first processing stage and the at least one subsequent processing stage are implemented with digital logic in a configurable gate array.

13. The system of claim 11 wherein the plurality of first paired values collectively represents the set of input values with fewer terms than the set of input values.

14. The system of claim 13 wherein the at least one second paired value represents the set of input values with fewer terms than the plurality of first paired values.

15. The system of claim 11 further comprising logic configured to compute the square of the common value.

16. The system of claim 11 further comprising logic configured to compute of the set of input values according to a cryptographic function.

17. A method executable by digital processing logic to compute a GNASH digest of a set of cryptographic values processed with a hash subkey, wherein the set of cryptographic values are initially treated as a set of active values and the hash subkey is initially treated as a multiplier value, the method comprising:

processing each of a plurality of pairs of first and second ones of the active values in parallel, wherein the parallel processing comprises multiplying the first ones of the active values by the multiplier value and combining the products with second ones of the active values, wherein the plurality of processed pairs represents the set of active values using fewer terms than the set of active values;

subsequently performing additional parallel processing using the plurality of processed pairs as the subsequent set of active values and using a square of the prior multiplier value as a subsequent multiplier value until a single resulting pair remains; and providing the GNASH digest as a function of the single resulting pair.

18. The method of claim 17 further comprising serially applying a first portion of the cryptographic values and a second portion of the cryptographic values to the digital processing logic, wherein the performing comprises repeating the processing for each of the first and second sets of portions to obtain first and second single resulting pairs, and further comprising computing the digest as a function of the first and the second single resulting pairs.

19. The method of claim 17 further comprising computing each of the set of cryptographic values according to a Galois counter mode (GCM) algorithm by the digital processing logic.

\* \* \* \* \*

UNITED STATES PATENT AND TRADEMARK OFFICE
CERTIFICATE OF CORRECTION

PATENT NO. : 8,290,147 B2
APPLICATION NO. : 12/609888
DATED : October 16, 2012
INVENTOR(S) : Gerardo Orlando et al.

It is certified that error appears in the above-identified patent and that said Letters Patent is hereby corrected as shown below:

In claim 17, column 11, line 17, the word "GNASH" should be changed to "GHASH".

In claim 17, column 12, line 10, the word "GNASH" should be changed to "GHASH".

Signed and Sealed this
Fifth Day of February, 2013

Teresa Stanek Rea
*Acting Director of the United States Patent and Trademark Office*